Feb. 3, 1959 C. S. ERNST 2,871,822
ANIMAL WATERING DEVICE
Filed Aug. 28, 1956
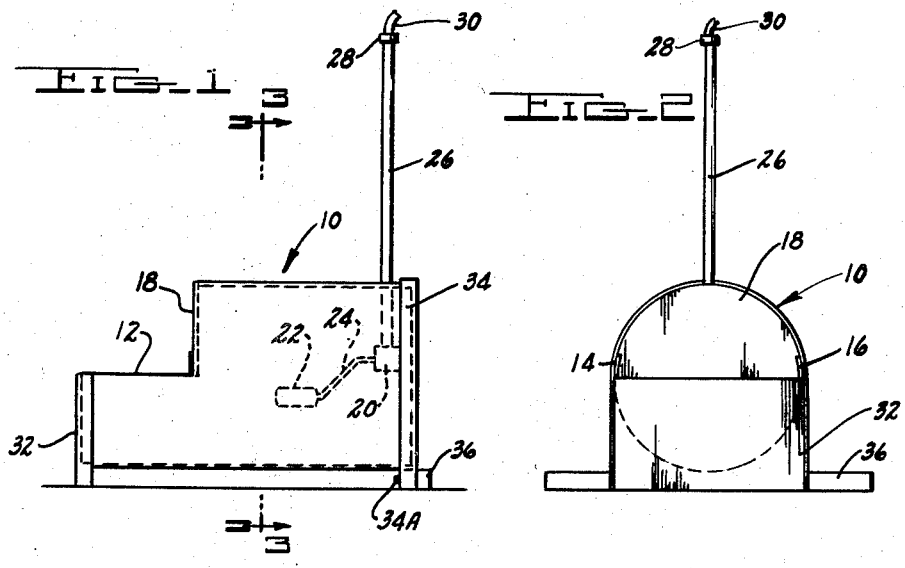
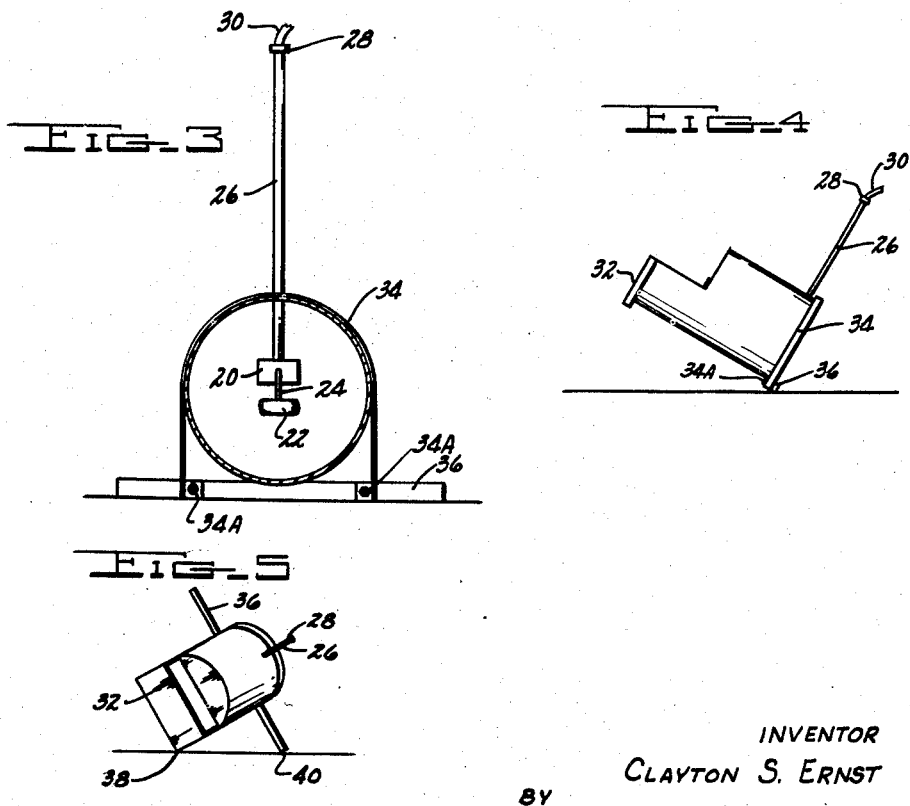
INVENTOR
CLAYTON S. ERNST
BY
KOTTS & SHERIDAN
ATTORNEYS

United States Patent Office 2,871,822
Patented Feb. 3, 1959

2,871,822

ANIMAL WATERING DEVICE

Clayton S. Ernst, Ann Arbor, Mich.

Application August 28, 1956, Serial No. 606,763

4 Claims. (Cl. 119—78)

The present invention relates generally to an improved liquid supply device for animals, and in particular to a watering device for hogs.

It is well known that when a watering tank is empty, hogs will attempt to overturn it. Also, if the water level in the watering tank is too high, hogs will splash the water out with their snouts to form a mud slough near the tank for wallowing. It is evident that such overturned tanks and mud sloughs around the water supply are a nuisance to the farmer.

A simple and efficient watering trough for hogs has long been sought. One requirement for such a trough is that it be light in weight and easily moveable, while eliminating the necessity of anchoring the same to prevent overturning when and if the water level in the tank becomes low. The tank should also readily lend itself to easy cleaning methods. Dirt and sediment will accumulate in a hog watering tank because a hog will carry dirt, feed and the like on its snout into the water supply when it drinks.

It is a principal object of the present invention to provide a lightweight, portable animal watering device which will maintain a predetermined level of water, and which may be quickly and easily cleaned.

It is another object of the present invention to provide a simple and efficient animal watering device which can be manufactured at relatively low cost, and which will have a long trouble free service life in use.

Other objects of this invention will appear in the following description and appended claims, reference being had to the accompanying drawings forming a part of this specification wherein like reference characters designate corresponding parts in the several views.

In carrying out the foregoing objects I have provided a small, relatively light weight tank which has a float controlled water supply valve therein. The float controlled valve is connected to a source of water through a handle mechanism. The float controlled valve assures the farmer that a predetermined level of water will be maintained in the tank at all times.

The major portion of the tank is covered to keep out unnecessary dirt. Any dirt which is carried into the tank by the hogs can be quickly and easily removed by using the handle to rock the tank about its supporting members which are arranged in a certain fashion.

In the drawings:

Fig. 1 is a side elevation of an animal watering trough embodying the present invention.

Fig. 2 is a front elevation of the trough shown in Fig. 1.

Fig. 3 is a sectional elevation taken along the lines 3—3 in the direction of the arrows, Fig. 1.

Fig. 4 is a reduced view showing the step of agitating the contents of the trough.

Fig. 5 is a reduced view showing the step of emptying the contents of the trough.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, a cylindrical tank is shown at 10. This tank has an open front portion 12 which gives the animals access to the interior of the tank. A pair of retaining fingers 14 and 16 are provided on the front portion of the tank. These retaining fingers permit the semi-circular front cover 18 to be moved into and out of position with ease. The cover 18 protects the interior of the tank, and the only opening to the tank is the opening 12. Positioned at the back of the tank is a float controlled valve 20. This valve 20 is coupled to a hollow float 22 through the arm 24 in the usual manner. When the float 22 descends vertically from a predetermined position, the valve 20 is opened to permit entry of more water. As the tank is again filled to the predetermined level and the float 22 rises, the valve again shuts off. A relatively long length of pipe 26 extends from the valve 20 through the top of the tank 10. The pipe 26 is supported in position by its coupling with the valve 20 and by the sides of the opening in the top of the tank 10 through which it extends. A coupling 28 is provided at the top end of the pipe 26. The coupling 28 permits a hose 30 to be coupled to the pipe 26. Thus, it is apparent that the water supply hose 30 may be positioned up off the ground away from possible damage.

A front support panel 32 is affixed to the forward end of the tank 10. This front support panel is rectangular in shape. A rear support panel 34 having a squared bottom portion is provided at the rearward end of the tank 10. This rear support panel 34 extends down below the bottom of the tank 10. Affixed to the rearward support panel 34 by suitable means such as the bolts 34a is an elongated fulcrum member 36. In the present instance, this fulcrum member takes the form of a wooden two by four. The elongated member 36 provides a sturdy support for the device.

The watering device of the present invention lends itself to a unique cleaning operation. This cleaning operation is carried out in two steps. The first step is the agitating or cleaning step demonstrated in Fig. 4, and the second step is the emptying step demonstrated in Figure 5. In performing the agitating or cleaning step, the handle pipe 26 is grasped in the hands of the farmer, and the device is rocked forward and back about the fulcrum member 36. This action causes the water to slosh back and forth in the tank 10 and loosen the sediment which has accumulated. As the device is rocked forward, the majority of the water moves in that direction and the float 22 is lowered. This permits the introduction of additional water under pressure through the valve 20, which aids in loosening the sediment. It has been found that in most instances a half dozen movements of the device back and forth will completely loosen the sediment which has accumulated in the tank.

The next step is to empty the loosened sediment from the tank. This is accomplished in the manner demonstrated in Fig. 5. The handle 26 is moved forward while the front and rear supports 32 and 36 are in contact with the ground. This action results in the tank 10 being tipped up and supported on the right lower edge 38 of the front support panel 32 and the right end 40 of the rear support panel 36. Since the fulcrum member 40 is considerably longer than the front support panel 32, the tank 10 is tilted off at an angle, and the dirty water is dumped out of the lip formed by the front right edge of the tank. Of course, it will be apparent that the dirty water can also be dumped out of the left forward edge of the tank by moving the handle in that direction.

It has been found that these few simple movements thoroughly cleanse the tank. After the movements have been completed and the tank comes to rest in the normal position, the float controlled valve 20 introduces a fresh supply of water to the predetermined level. This cleaning operation is easy to perform and takes but a few minutes of the farmer's time.

From the foregoing description it will be apparent that I have provided a simple and efficient animal watering device which can easily be moved from place to place. The device is simple in construction and can be quickly and easily cleaned. It is sturdy and is so arranged as to be free from the usual difficulties which attend such a device.

Having thus described my invention, I claim:

1. A liquid feeding device for animals comprising a tank having a front wall and a back wall constituting longitudinal ends, a vertically extending actuating handle-type liquid inlet means secured to said back wall, said inlet means having a constant liquid level control means on one end and an elevated inlet connection means on the other end, said front wall constituting an upper section and a lower section, said lower section being offset forwardly to provide an animal access opening, a front support panel affixed to and extending below the lower section of the front wall, a rear support panel extending downwardly from the rear wall and having at its lower end a ground support means extending outwardly and transversely to said tank.

2. A liquid feeding device for animals as claimed in claim 1 wherein a coupling is provided on the upper end of the actuating handle inlet means, and a flexible hose is connected at one end to said coupling and at the other end to a source of liquid.

3. A liquid feeding device for animals as claimed in claim 1 wherein the ground support member is substantially the same length as the actuating handle inlet means, and is greater in length than the longitudinal length of the tank.

4. A liquid feeding device for animals as claimed in claim 1 wherein the tank is provided with retaining fingers which hold the upper section of the front wall in position and permit its removal.

References Cited in the file of this patent

UNITED STATES PATENTS

| | | |
|---|---|---|
| 1,102,572 | Cotton | July 7, 1914 |
| 1,307,521 | Shaffer | June 24, 1919 |
| 1,314,585 | Glidden | Sept. 2, 1919 |
| 2,477,138 | Olson | July 26, 1949 |
| 2,512,934 | Hancock | June 27, 1950 |